United States Patent [19]

Blazey

[11] Patent Number: 5,745,260
[45] Date of Patent: Apr. 28, 1998

[54] COARSE/FINE FONTS

[75] Inventor: Richard N. Blazey, Penfield, N.Y.

[73] Assignee: Eastman Kodak Company, Rochester, N.Y.

[21] Appl. No.: 575,745

[22] Filed: Dec. 20, 1995

[51] Int. Cl.$^6$ .................................................. G06F 15/00
[52] U.S. Cl. ........................ 358/456; 382/194; 395/150
[58] Field of Search ................................ 358/428, 429, 358/443, 455, 456, 457, 458, 459, 460, 465; 382/194; 395/150

[56] References Cited

U.S. PATENT DOCUMENTS

| 4,916,545 | 4/1990 | Granger | 358/456 |
| 4,984,097 | 1/1991 | Shu | 358/429 |
| 5,040,080 | 8/1991 | Scholten | 358/454 |
| 5,053,887 | 10/1991 | Thompson | 358/457 |
| 5,323,245 | 6/1994 | Rylander | 358/536 |
| 5,361,139 | 11/1994 | Speciner | 358/445 |

Primary Examiner—Thomas D. Lee
Assistant Examiner—Jerome Grant II
Attorney, Agent, or Firm—James D. Leimbach

[57] ABSTRACT

A method and apparatus for generating fonts that can be used for digital halftoning comprising: providing a computational element capable of performing digital halftoning algorithms; inputting a digitized version of a continuous toned image into the computational element; dividing the digitized image into a series of macropixel elements, where each macropixel is made up of N micropixels; identifying central feature areas and dispersed micropixel areas within each macropixel; generating an integral number of micropixels to represent dispersed micropixel areas, where the integral number is a fraction of a central feature area total; representing the macropixel with a font generated from the central area feature and a reconstituted dispersed area feature, the reconstituted dispersed area feature employing the fraction to determine density of the dispersed area.

15 Claims, 2 Drawing Sheets

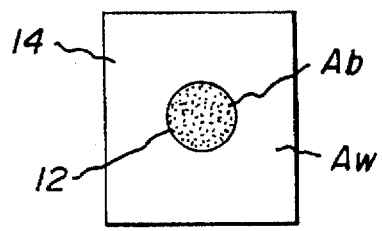
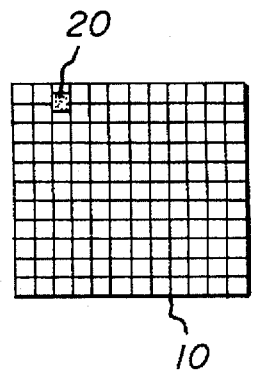
FIG. 2                FIG. 3
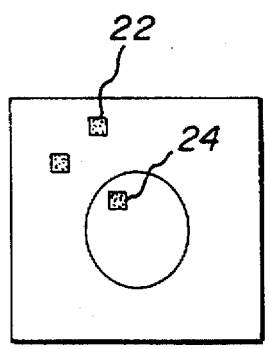
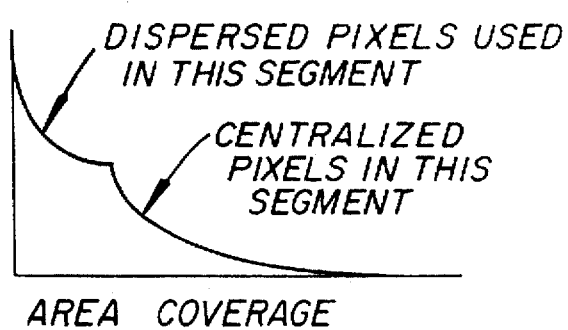
FIG. 4                FIG. 5

COARSE/FINE FONTS

FIELD OF INVENTION

The invention relates generally to the field of digital halftoning, and in particular to representing dispersed micropixels in a font design for digital halftoning systems.

BACKGROUND OF THE INVENTION

In halftone imaging, problems exist in images having high optical densities. The spacing of printed density levels becomes sparse and densities in the source image cannot be reproduced accurately, leading to the production of image artifacts such as contours. This problem has typically been solved in the case of digital halftones by using many tiny micropixels to make up the halftone dot or macropixel. However, this strategy is limited by the degree to which very small, very closely spaced micropixels can be produced as is explained in the following section.

Raster image processing algorithms which convert digital continuous tone images to digital halftones fall into two families, tilers and samplers. Within these families there are subcategories such as dither dot, cluster dot, error diffusion, etc. Tilers have only 1 screen pattern, usually oriented at zero or 90 degrees to the viewing direction. Sampling screeners may have several different screens, particularly in color systems and the screens are at different angles to the viewing direction and to each other. Many of the prior art references refer to screeners in the sampling family.

Many of them are involved with cures for the problem of image Moire, which does not occur in tiling screeners.

The prior art device which issued to Shu in U.S. Pat. No. 4,984,097 (hereinafter referred to as Shu) attempts to solve the problem of obtaining a higher number of gray levels at high densities. However, their solution is for a device employing a two screen sampling screener, and, therefore, solves inherent problems associated with samplers but not tilers.

Another prior art device is shown in U.S. Pat. No. 5,053,887 issued to Thompson (hereinafter Thompson) which propagates the difference between the wanted and actual image density (density error) between image tiles in order to make it less visible in their dither dot system. However, the device discussed is a dither dot type, and does not address a solution operative on a cluster dot system.

U.S. Pat. No. 5,040,080 to Scholten (hereinafter referred to as Scholten) discloses an electronic screen generator for generating desired screening patterns. The electronic screen generator is formed by creating, from a master dot pattern, a plurality of transformed patterns that, when repeated in orthogonal directions throughout a plane, form screen patterns of preselected angular orientations and line frequencies. The master dot and each macrodot derived from the master dot comprises a rectangular matrix whose elements comprise threshold values defining reflectance levels with respect to which the reflectance of the scanned object are to be compared. An object is scanned pixel by pixel, and bit is set in an image that is formed element by element, depending on the results of comparison of the reflectance of a particular pixel with the corresponding threshold value in the associated macrodot. The size of the macrodot together with the scanning resolution determines the screen frequency of the master dot.

U.S. Pat. No. 5,323,245 to issued to Rylander (hereinafter Rylander) discloses a screen system used in the electro-optical reproduction of halftone pictures in multi-color prints. Partial screens and screen systems are produced by an algorithm for use with a digitized image that provides a means of simulating a continuous tone image containing a range of gray shades. A threshold equation is used to calculate a threshold gray value that is compared to the desired local image value to determine whether that particular point should be "on" or "off". The generated screen comprises columns and rows of halftone dot centers, and the algorithm allows independent adjustment of the row and column directions, and unequal densities along those directions.

In laser dye ablation images, dye is removed during the writing process, effectively writing white. Micropixels which are separated from the main feature often do not remove all of the dye during the writing process, and hence regions halftoned with dispersed pixels have an effective density which is significantly higher than the density of the white area of the central features.

There are several ways of using these dispersed micropixels to build a "font" which will contain all the micropixel patterns (slices) necessary to reproduce all of the densities in a medical image. One method of allocating dispersed and centralized micropixels is to segregate them in density space allocating centralized micropixels below a density threshold where larger area increments can be tolerated and using dispersed micropixels above that density.

This segmented approach has several problems including: (1) Errors which are introduced when the upper and lower segments of the font join, and (2) contours in the low density segment when density states made by varying the number of centralized micropixels are too far apart.

As can be seen from the foregoing description, there remains a need in the art for a halftone imager from the tiler family that can more accurately represent high optical densities with numerous shades of gray.

SUMMARY OF THE INVENTION

The present invention is directed to overcoming one or more of the problems set forth above. Briefly summarized, according to one aspect of the present invention a method for generating a font for use in digital halftoning comprising the steps of: providing a computational element capable of performing digital halftoning algorithms; inputting a digitized version of a continuous toned image into the computational element; said digitized image divided into a series of macropixel elements, where each macropixel is made up of N micropixels; identifying central feature areas and dispersed micropixel areas within each macropixel; generating an integral number of micropixels to represent dispersed micropixel areas, where the integral number is a fraction of a central feature area total; representing the macropixel with a font generated from the central area feature and a reconstituted dispersed area feature, the reconstituted dispersed area feature employing the fraction to determine density of the dispersed area.

In laser dye ablation images, micropixels which are separated from the main feature often do not remove all of the dye and hence regions halftoned with dispersed pixels have an effective density, $D_j$, which is significantly higher than, the density of the central feature, $D_s$. This being due to the central feature having all the dye removed. It should be understood to those skilled in the art that the laser dye ablation printers discussed here operate by removing dark dye areas, the result being essentially to write white areas to the medium.

It is possible to represent the area coverage, $\delta a$, of one of these dispersed micropixels as a fraction, $k^*\Delta a$, of the area of a micropixel located in the central main feature where all dye is removed (binary micropixel).

$$\delta a = k^* \Delta a \text{ where } k<1$$

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The advantage of this system over the prior art is in providing superior font generation for micropixels of the same size as the prior art. This is a less expensive approach than making still smaller micropixels by using more precise optics and mechanics. It also has advantages over other dispersed dot approaches in that font joining artifacts are not produced and the trimming feature of dispersed dots is available at both low and high densities.

BRIEF DESCRIPTION OF THE DRAWINGS

FIG. 2 is a diagram illustrating a macrocell;

FIG. 3 is a diagram showing a digital halftone macropixel that comprises many micropixels;

FIG. 4 is an illustration of a macropixel that shows a dispersed micropixel in relation to the entire macropixel; and FIG. 5 is a graph illustrating segmentation to allocate centralized and dispersed micropixels.

DETAILED DESCRIPTION OF THE INVENTION

Figure 1:
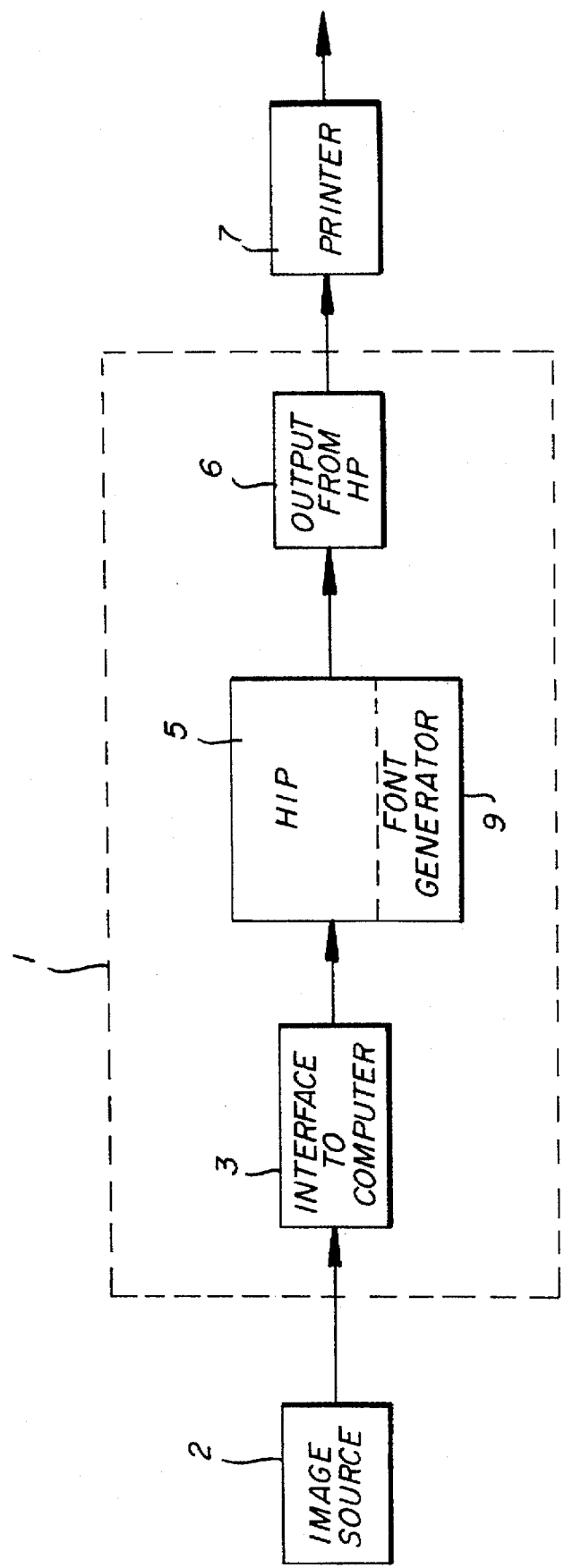
FIG. 1 is a block diagram of the system as envisioned by the present invention.

It is been discovered, within the art of digital halftoning, that employing numerous macropixel elements to represent contone images, that areas removed from the central feature within macropixels, typically referred to dispersed micropixels can be represented as a fraction of a micropixel located in the central feature of the macropixel.

The basic system as envisioned by the present invention, as illustrated in FIG. 1, includes a computational element 1 having a halftone image processor (HIP) 5 used for halftoning images. The image is generated by taking a contone image source 2 and inputting into computational element 1 a digital version of the contone image. The techniques used in acquiring the digital image are well known to those skilled in the art. The HIP 5 will then operate on the digital image employing halftoning algorithms in conjunction with the font generator 9. Fonts are generated as discussed hereinbelow, and sent to the output section where they will be placed in a storage device, such as stored font 7 for later use. The stored fonts can be employed as a database of fonts to perform digital halftoning operations on contone images. Typically, fonts are generated offline and stored in memory. This is the method of the preferred embodiment. Although it is also envisioned that the fonts may be generated online, this is not the preferred embodiment.

Referring now to FIG. 2, in conjunction with the following discussion halftone imaging processes are governed by the Murray-Davies equation as shown in Equation 1 below $$D = D_s - \log[1 - a(1 - 10^{-D_d})] \qquad \text{Equation 1}$$

Where a is the area coverage of a halftone tile or macropixel, as indicated by Equation 2. That is the fraction which is opaque or black.

$$a = \frac{A_b}{A_b + A_w} \qquad \text{Equation 2}$$

Here, $A_b$ 12 is the dark area of macropixel 10, and $A_w$ 14 is the light area of macropixel 10. $D_s$ is the minimum or base density with all media removed and $D_d$ is the dye density ($D_d = D_{max} - D_s$)

In a digital halftone the macropixel 10 is composed of many smaller micropixels 20 as illustrated in FIG. 3. The dark areas, $A_b$, and light areas, $A_w$, of the macropixel are typically expressed in terms of the number of micropixels used for that particular area. Referring back to Equation 2, at high optical densities, where a ~1, a one micropixel change in a single micropixel, $\Delta a$, makes a large density increment $\Delta D$. This quantization error can cause unwanted contours that are especially undesirable in medical images.

The relationship of a dispersed micropixel 22 to a micropixel within the central feature 24 is illustrated in FIG. 4a where the dispersed micropixel 22 is seen as being detached from the central feature 24. In laser dye ablation images, the image is formed by having the laser remove dye from the medium. Micropixels which are separated from the main feature often do not remove all of the dye and hence regions halftoned with dispersed pixels have an effective density, $D_j$, which is significantly higher than $D_s$.

It is possible to represent the area coverage, $\delta a$, of one of these dispersed micropixels as a fraction, k, of the area of the central feature (expressed in number of micropixels) where all dye is removed, as shown by the relationship in Equation 3.

$$\delta a = k^* \Delta a \text{ where } k<1 \qquad \text{Equation 3}$$

There are several ways of using these dispersed micropixels to build a "font" which will contain all the necessary micropixel patterns (slices) to reproduce all of the densities in a medical image. One method of allocating dispersed and centralized micropixels is to segregate them in density space allocating centralized micropixels below a density threshold where larger area increments can be tolerated and using dispersed micropixels above that density, as shown in FIG. 5.

This segmented approach has the previously discussed problems including: (1) Errors which are introduced when the upper and lower segments of the font join, and (2) contours in the low density segment when density states made by varying the number of centralized micropixels are too far apart.

These problems within the prior art are addressed by the generation of the bit mapped font slices as taught by the present invention. With "bitmapped" font slices each slice can be independent of its predecessors, so dispersed micropixels can be used to trim the density to any desired value. In this method the area coverage of the density state can be represented by Equation 4.

$$a_j = m_j \Delta a = n_j \delta a \qquad \text{Equation 4}$$

where $\Delta a$ is the area of a micropixel in the central feature 24, and $\delta a$ is the area of a dispersed micropixel 22. The present invention envisions that the $\delta a$ be expressed as a portion of the central feature, where $\delta a$ is constant value. The term $n_j \delta a$ always resulting in an integral number of micropixels. It is also envisioned that a function can be used to determine $\delta a$ as a variable function, which will be discussed further below. The term $a_i$, as envisioned by the present invention, can be trimmed by adjusting integers $m_i$ and $n_i$ arbitrarily.

According to one aspect of the present invention, $m_i$ and $n_i$ are found as follows. First $a_i$ is found by using Equation 4 then $m_i$ is the largest integer divisor of $a_i$ and $n_i$ is found from the remainder using $$n_i = int \frac{(a_i - m_i \Delta a)}{\delta a} \qquad \text{Equation 5}$$

The effective area of a dispersed micropixel, $\delta a$, may also vary with $n_i$. It can be assumed that there exists a function f as shown in Equation 6.

$$a_i = f(n_i) \qquad \text{Equation 6}$$

Then we may solve for $n_i$ by application of an inverting function as shown in Equation 7.

$$n_i = f^{-1}(a - m_i \Delta a) \qquad \text{Equation 7}$$

The positions of dispersed micropixels 22 within the macropixel cell 10 are determined empirically. The goal is to find a pattern for adding dispersed micropixels 22 which produces the smoothest and most robust relationship between $\delta a$ and $n_i$.

The invention has been described with reference to a preferred embodiment. However, it will be appreciated that variations and modifications can be effected by a person of ordinary skill in the art without departing from the scope of the invention.

PARTS LIST

1. Computational element
2. Image source
3. digitize image
5. halftone image processor
6. output section
7. stored font
9. font generator
10. macropixel
12. dark area of the macropixel
14. light are of the macropixel
20. micropixels
22. dispersed micropixels
24. micropixel within the central feature

What is claimed is:

1. A method for generating a font for use in digital halftoning comprising the steps of:
   providing a computational element capable of performing digital halftoning algorithms;
   inputting a digitized version of a continuous toned image into the computational element;
   dividing the digitized image into a series of macropixel elements, where each macropixel is made up of N micropixels;
   identifying a central feature area and a detached micropixel areas within each macropixel, wherein the detached micropixel area is separated from the central feature area;
   generating an integral number of micropixels to represent detached micropixel areas, where the integral number is a fraction of a central feature area total;
   representing the macropixel with a font generated from the central area feature and a reconstituted detached area feature, the reconstituted detached area feature employing the fraction to determine density of the detached area.

2. The method of claim 1 wherein the step of generating an integral number of micropixels to represent detached micropixel areas, further comprises generating an integral number that is a constant.

3. The method of claim 1 wherein the step of generating an integral number of micropixels to represent detached micropixel areas, further comprises generating an integral number as a result of a variable function.

4. The method of claim 3 wherein the variable functione employs the area of the central feature to arrive at the integral number.

5. The method of claim 1 further comprising the step storing generated fonts.

6. The method of claim 1 further comprising the step of employing previously stored fonts to digitally halftone images.

7. A device for generating fonts used in digital halftoning of images comprising:
   a computational element having means for executing digital halftoning algorithms on digitized versions of images;
   means for inputting a digitized version of a contoned image into the computational means;
   means for dividing the contoned image into a plurality of predetermined, integrally spaced macropixels;
   means for dividing the macropixels into a plurality of micropixels;
   means for identifying a central feature within each of the macrocells;
   means for identifying detached micropixels among the micropixels that are separated from the central feature;
   means for determining the relative optical density of the detached micropixels compared to the central feature of the macropixel;
   means for generating an integral number of micropixels to represnt the detached micropixel; and
   means for converting the macropixel pattern into a micropixel image pattern.

8. The device of claim 7 whrein the means for generating an integral number of micropixels to represent detached micropixel areas, further comprises means for generating an integral number that is a constant.

9. The device of claim 8 wherein the means for generating an integral number of micropixels to represent detached micropixel areas, further comprises generating an integral number as a result of a variable function.

10. The device of claim 9 wherein the variable function employs the area of the central feature to arrive at the integral number.

11. The device of claim 7 further comprising means for storing generated fonts and means for employing stored fonts to halftone images.

12. A method of digitally halftoning detached micropixels comprising the steps of:
   providing continuous image data representative of a con-tone image in a digital format to a processing device having means for performing halftoning algorithms on the digitally formatted image data;
   dividing digitized contoned image data into a plurality of contoned macropixel at predetermined, integrally spaced location;
   determining the optical density of each of the macropixel;

converting the contoned macropixels into a plurality of micropixels;

identifying detached micropixels that are separated from central features of the macropixel and determining their density with respect to the central feature; and representing the detached micropixel as a fraction of the central features.

13. The method of claim 12 where the step of identifying detached micropixels and determining their density with respect to the central feature further comprises determining the density of the detached micropixel as a fractional amount of micropixels determined to comprise the central feature, the fractional amount being an integral number of micropixels.

14. The method of claim 13 wherein the fractional amount is a constant value.

15. The method of claim 13 wherein the fractional amount is determined as a variable function.

* * * * *